US006743054B2

(12) United States Patent
Wu

(10) Patent No.: US 6,743,054 B2
(45) Date of Patent: Jun. 1, 2004

(54) ADAPTER DEVICE ASSEMBLY CONNECTING WITH A HARD DISK DRIVE AND A BACKPLANE

(75) Inventor: Jerry Wu, Irvine, CA (US)

(73) Assignee: Hon Hai Precision Ind. Co., LTD, Taipei Hsien (TW)

( * ) Notice: Subject to any disclaimer, the term of this patent is extended or adjusted under 35 U.S.C. 154(b) by 0 days.

(21) Appl. No.: 10/216,047

(22) Filed: Aug. 9, 2002

(65) Prior Publication Data

US 2004/0029458 A1 Feb. 12, 2004

(51) Int. Cl.[7] .............................................. H01R 25/00
(52) U.S. Cl. ....................... 439/638; 439/61; 439/928.1
(58) Field of Search .......................... 439/61, 76.1, 638, 439/928.1

(56) References Cited

U.S. PATENT DOCUMENTS 5,227,957 A * 7/1993 Deters ........................ 361/686
5,507,650 A * 4/1996 Larabell ....................... 439/61
5,515,515 A * 5/1996 Kennedy et al. ............ 710/302
6,325,636 B1 * 12/2001 Hipp et al. .................... 439/61
6,347,963 B1 * 2/2002 Falkenberg et al. ......... 439/638
2002/0123249 A1 * 9/2002 Izzo ............................. 439/61
2003/0003809 A1 * 1/2003 Maiers ........................ 439/629
2003/0032333 A1 * 2/2003 Kwong ........................ 439/638
2003/0045170 A1 * 3/2003 Ohkawa et al. ............. 439/638

* cited by examiner

Primary Examiner—Michael C. Zarroli
(74) Attorney, Agent, or Firm—Wei Te Chung

(57) ABSTRACT

An electrical adapter assembly (1) for electrically connecting an electrical connector (52) mounted a backplane (5) to an electrical component (62) of a hard disk drive (6) includes a first adapter subassembly (10) adjacent to and electrically connecting to the electrical connector (52). A second adapter subassembly (20) is placed next to and electrically connecting to the first adapter subassembly. Additionally, a pair of cable assemblies (30, 40) are placed between the second adapter subassembly and the hard disk drive and each has a pair of electrical sockets (34, 44) for electrically connecting a corresponding second receptacle connector (26, 28) of the second adapter subassembly to the electrical component of the hard disk drive.

10 Claims, 2 Drawing Sheets

ADAPTER DEVICE ASSEMBLY CONNECTING WITH A HARD DISK DRIVE AND A BACKPLANE

BACKGROUND OF THE INVENTION

1. Field of the Invention

The present invention relates to an electrical adapter assembly, and particularly to an electrical adapter assembly for electrically connecting a backplane connector to an IDE HDD (Hard Disk Drive).

2. Description of Prior Art

In a server storage device, a backplane is used whereon a plurality of SCA-2 (Single Connector Attachment) receptacle connectors are mounted. Each hard disk drive (HDD) is provided with an SCA-2 plug connector for engaging with a corresponding SCA-2 receptacle connector on the backplane. However, for some HDDs, they are not provided with SCA-2 plug connectors, but with three-in-one (3 in 1) combo header connectors. For these HDDs, adapter assemblies are necessary so that they can connect to the SCA-2 receptacle connectors on the backplane. Serial ATA (Advance Technology Attachment) electrical connector, is proposed for use as an interface of fast-talking drives, which will effectively improve the bandwidth, or capacity for data, between hard disk drives and other PC components. Advantageously, theses adapter assemblies should incorporate the Serial ATA connectors to utilize the advantages thereof.

Hence, an electrical adapter assembly of the present invention is desired to meet the above-mentioned requirements.

BRIEF SUMMARY OF THE INVENTION

A first object of the present invention is to provide an electrical adapter assembly for electrically connecting an IDE HDD to a backplane connector;

A second object of the present invention is to provide an electronic assembly having a plurality of IDE HDDs, a backplane on which a plurality of connectors are mounted and an electrical adapter assembly electrically connecting the IDE HDDs to the connectors on the backplane.

To fulfill the above-mentioned objects, an electrical adapter assembly in accordance with a preferred embodiment of the present invention is used for electrically connecting an electrical connector mounted on a backplane to an IDE HDD. The adapter assembly has a first adapter subassembly, a second adapter subassembly and a pair of cable assemblies which are sequently and side-by-side arranged. The first adapter subassembly has a first adapter board, a first plug connector for engaging with the electrical connector of the backplane and a first receptacle connector mounted on opposite sides of the first adapter board. The second adapter subassembly has a second adapter board, a second plug connector for engaging with the first receptacle connector of the first adapter subassembly and a pair of second receptacle connectors mounted on opposite sides of the second adapter board. Each cable assembly has a pair of electrical sockets for electrically connecting a corresponding second receptacle connector of the second adapter subassembly to the IDE HDD.

Other objects, advantages and novel features of the invention will become more apparent from the following detailed description of the present embodiment when taken in conjunction with the accompanying drawings.

DETAILED DESCRIPTION OF THE INVENTION

Figure 1:
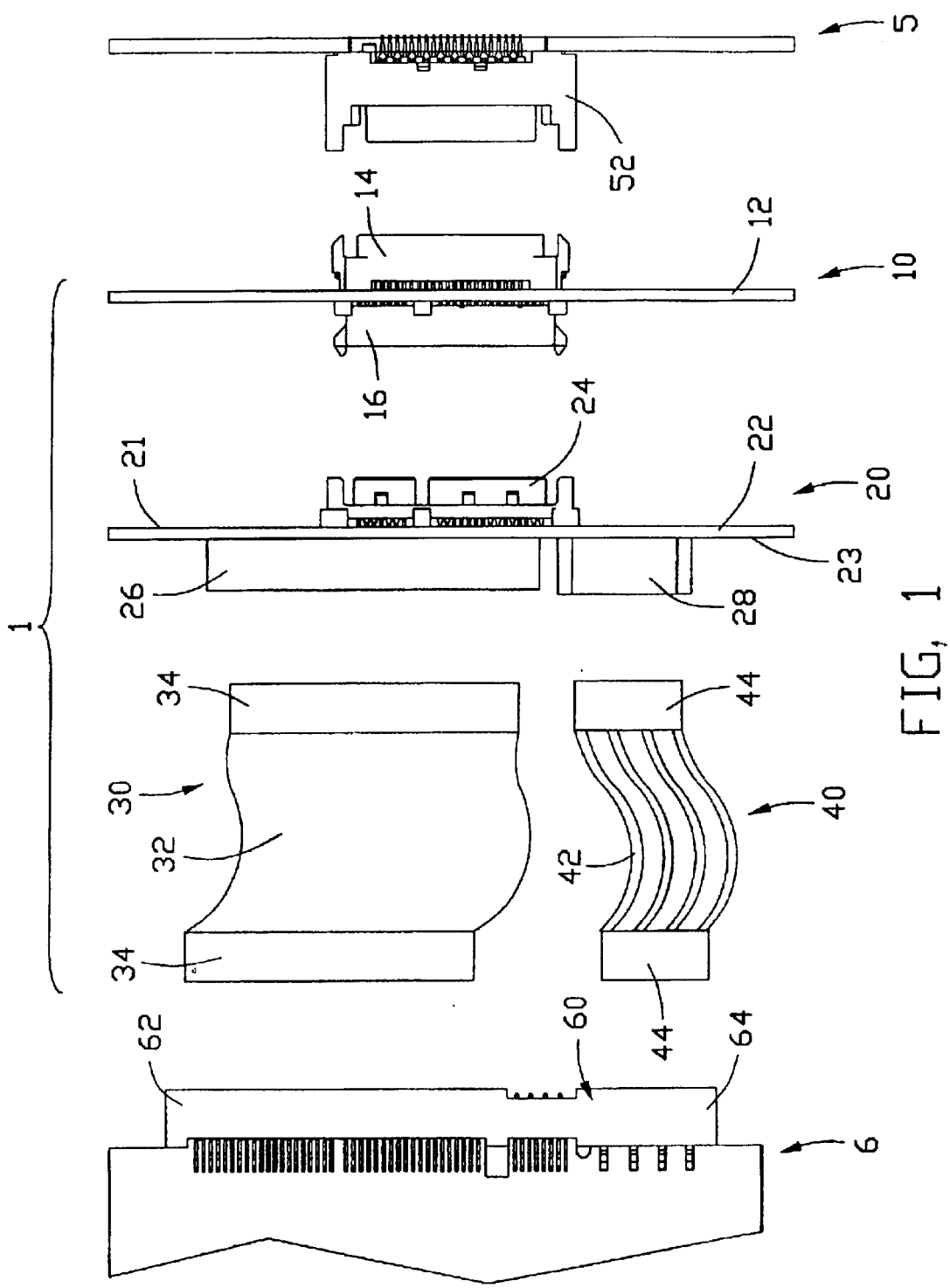
FIG. 1 is an exploded plane view of an electrical adapter assembly in accordance with a first embodiment of the present invention, for connecting an IDE HDD to a backplane connector.

Reference will now be made to drawings, and particularly to FIG. 1, an electrical adapter assembly 1 in accordance with a first embodiment of the present invention is shown in its exploded view for electrically connecting an IDE HDD 6 to a backplane connector 52 on a backplane 5. In accordance with the preferred embodiment of the present invention, the backplane connector 52 is a 40-position SCA-2 receptacle connector. The adapter assembly 1 comprises a first adapter subassembly 10, a second adapter subassembly 20, a pair of cable assembles 30, 40, which are sequently side-by-side arranged between the backplane 5 and the IDE HDD 6.

The first adapter subassembly 10 is placed adjacent to the backplane 5 and includes a first adapter PCB (printed circuit board) 12, a first plug connector 14 for mating with the backplane connector 52 on the backplane 5 and a first receptacle connector 16 mounted on opposite sides of the first adapter PCB 12. In accordance with the preferred embodiment of the present invention, the first plug connector 14 is a 40-position SCA-2 plug connector, while the first receptacle connector 16 is a 22-position Serial ATA receptacle connector.

The second adapter subassembly 20 is placed next to the first adapter subassembly 10 and includes a second adapter PCB 22, a second plug connector 24 which is a 22-position Serial ATA plug connector, mounted on one side 21 of the second PCB 22 for mating with the first receptacle connector 16 of the first adapter subassembly 10. Additionally, a pair of second receptacle connectors 26, 28 are side-by-side arranged on the other side 23 of the second adapter PCB 22, opposite to the second plug connector 24. In accordance with the preferred embodiment of the present invention, the pair of second receptacle connectors 26, 28 are a 40-position header connector and a 4-pin power header connector, respectively.

The pair of cable assemblies 30, 40 are side-by-side arranged, next to the second adapter subassembly 20. The cable assembly 30 has a cable 32 and a pair of electrical sockets 34 which are IDC (Insulation Displacement Connection) sockets attached to opposite ends of the cable 32. One socket 34 is for mating with the head connector 26 of the second subassembly 20, while the other socket 34 is for mating with a corresponding portion 62 of the three-in-one combo heard connector 60 attached to the IDC HDD 6. The cable assembly 40 has a 4-position power wire hardness 42 and a pair of 4 pin power sockets 44 attached to opposite ends of the wire hardness 42. One power socket 44 is for mating with the 4-pin power header connector 28 of the second subassembly 20, while the other power socket 44 is for mating with a corresponding portion 64 of the three-in-one combo header connector 60 attached to the IDC HDD 6. In this way, the adapter assembly 1 of the present invention electrically connects the backplane connector 52 on the backplane 5 to the IDE HDD 6.

Figure 2:
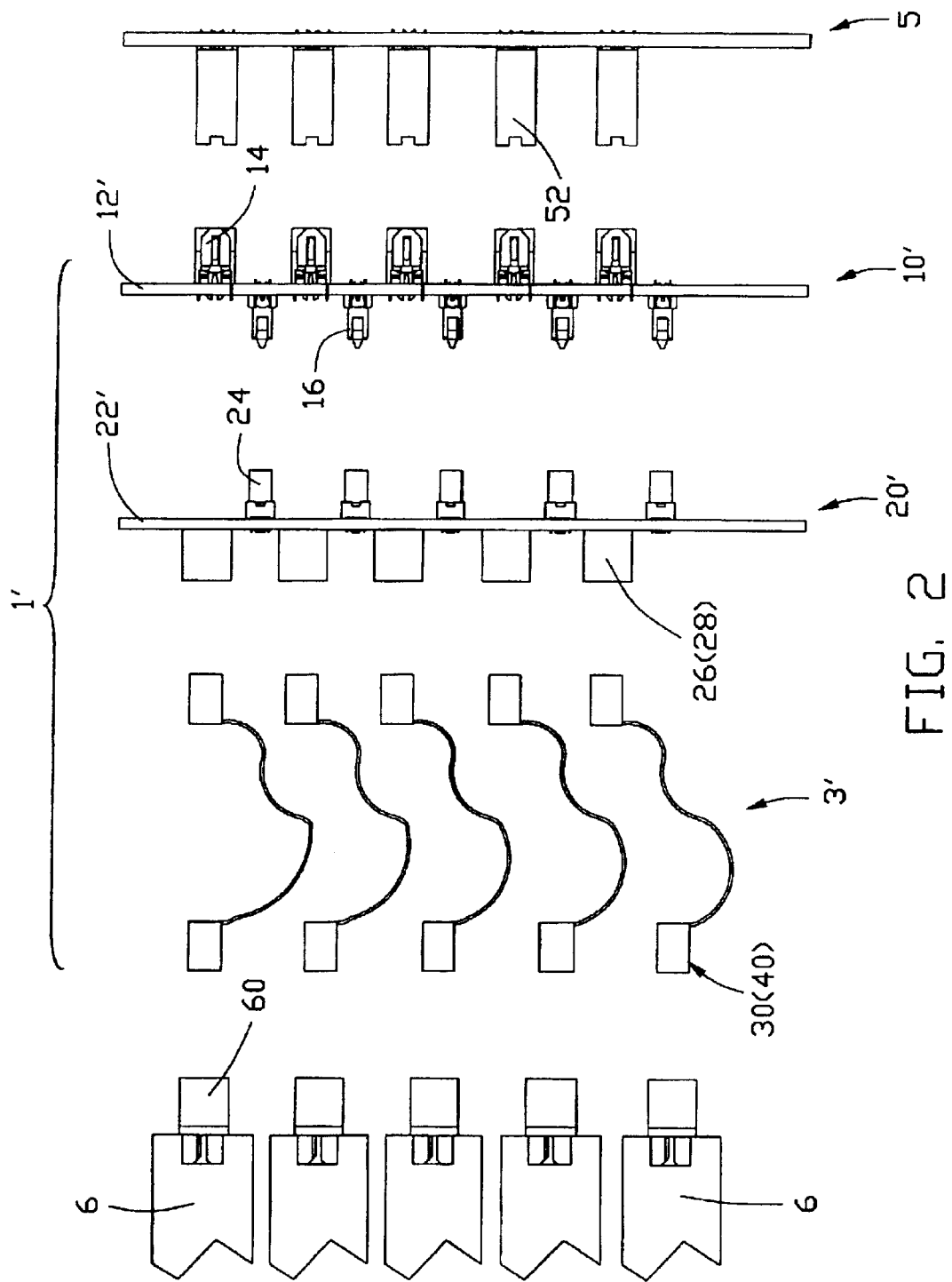
FIG. 2 is an exploded plane view of an electrical adapter assembly in accordance with a second embodiment of the present invention, for connecting a plurality of IDE HDDs to a plurality of backplane connectors, wherein an aspect view of FIG. 2 is perpendicular to that of FIG. 1.

Further referring to FIG. 2, it shows, in accordance with a second preferred embodiment of the present invention, how a plurality of IDE HDDs 6 are electrically connected to a corresponding number of backplane connectors 52 on the backplane 5. Like the first embodiment, each backplane connector 52 is a 40-position SCA-2 receptacle connector. An adapter assembly 1' is provided for electrically connecting the IDE HDDs 6 to the backplane 5. The adapter assembly 1' has a first adapter subassembly 1' adjacent to the backplane 5, a second adapter subassembly 2' next to the first adapter subassembly 1', and a plurality of cable assemblies 3' between the second subassembly 2' and the IDE HDDs 6. The first subassembly 1' has a first adapter board 12', a plurality of the first plug connectors 14 for mating with respective electrical connectors 52 of the backplane 5 and a same number of first receptacle connectors 16 mounted onto opposite sides of the first adapter board 12'. Like the first embodiment, each first plug connector 14 is a 40-position SCA-2 plug connector, and each first receptacle connector 16 is a 22-position Serial ATA receptacle connector. The second adapter subassembly 20' has a second adapter board 22', a plurality of second plug connectors 24 for mating with respective first receptacle connectors 16 of the first adapter subassembly 10' and a same number of pairs of second receptacle connectors 26, 28 mounted on opposite sides of the second adapter board 22'. Like the first embodiment, each second plug connector 24 is a 22-position Serial ATA plug connector, and each second receptacle connector 26 is a 40-position header connector and each second receptacle connector 28 is a 4-pin power header connector. Each of the cable assemblies 3' has the pair of cable assemblies 30, 40 for electrically connecting the pair of second receptacle connectors 26, 28 of the second adapter assembly 20' to the 3-in-1 combo header connector 60 of a corresponding IDE HDD 6.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electrical adapter assembly for electrically connecting a backplane connector (52) mounted on a backplane (5) to a hard disk drive (6), comprising:
    a first adapter subassembly (10) placed next to and electrically connecting to a backplane connector (52);
    a second adapter subassembly (20) placed next to and electrically connecting to the first adapter subassembly (10); and
    a pair of cable assemblies (30, 40) placed between and electrically connecting the second adapter subassembly (20) to a hard disk drive (6); wherein
        the first adapter subassembly (10) includes a first adapter board (12), a first plug connector (14) for mating with the backplane connector (52) mounted on the backplane (5) and a first receptacle connector (16) mounted on opposite sides of the first adapter board (12).

2. The electrical adapter assembly as claimed in claim 1, wherein the second adapter subassembly includes a second adapter board, a second plug connector mounted on one side of the second adapter board for mating with the first receptacle connector of the first adapter subassembly, and a pair of second receptacle connectors mounted on another side of the second adapter board.

3. The electrical adapter assembly as claimed in claim 2, wherein each of the cable assemblies has a pair of electrical sockets for engaging with a corresponding second receptacle connector of the second adapter subassembly and an electrical connector of the hard disk drive.

4. The electrical adapter assembly as claimed in claim 1, wherein the first receptacle connector is a Serial ATA receptacle connector.

5. The electrical adapter assembly as claimed in claim 4, wherein the first receptacle connector is a 22-position Serial ATA receptacle connector.

6. An electronic assembly comprising:
    a backplane (5) having an electrical connector (52) mounted thereon;
    a hard disk drive (6) having a three-in-one header connector (60) mounted thereon; and
    an electrical adapter assembly (1) for electrically connecting the hard disk drive (6) to the backplane (5) and including a first adapter subassembly (10) electrically connecting to the electrical connector (52) mounted on the backplane (5), a second adapter subassembly (20) connecting to the first adapter subassembly (10) and a pair of cable assemblies (30, 40) connecting between the second adapter subassembly (20) and the three-in-one header connector (60) of the hard disk drive (6); wherein
        the first adapter subassembly (10) includes a first adapter board (12), a first plug connector (14) mating with the electrical connector (52) mounted on the backplane (5) and a first receptacle connector (16) mounted on opposite sides of the first adapter board (12), the first receptacle connector (16) being a Serial ATA receptacle connector, and the electrical connector (52) mounted on the backplane (5) being an SCA-2 receptacle connector.

7. The electronic assembly as claimed in claim 6, wherein the second adapter subassembly includes a second adapter board, a second plug connector mounted on one side of the second adapter board mating with the first receptacle connector of the first adapter subassembly, and a pair of second receptacle connectors mounted on another side of the second adapter board.

8. The electronic assembly as claimed in claim 7, wherein each of the cable assemblies has a pair of electrical sockets for engaging with a corresponding second receptacle connector of the second adapter subassembly and the three-in-one header of the hard disk drive.

9. The electronic assembly as claimed in claim 7, wherein each of the cable assemblies has a pair of electrical sockets for engaging with a corresponding second receptacle connector of the second adapter assembly and the electronic component of a corresponding hard disk drive, respectively.

10. An interconnection system between first and second parts, comprising:
    a first connector (60) mounted on the first part (6);
    a second connector (52) mounted on the second part (5);
    an intermediate part (20) with one port (26, 28) electrically connected to the first connector (60) via a flexible cable (32, 42), and another port (24) electrically connected to the second connector (52) via an adaptor (10) which provides one mating port (16) mated with said another port (24) and another mating port (14) mated with said second connector (52); wherein
        a pair of connectors (34, 44) attached to two opposite ends of the cable (32, 42), and mechanically and electrically connected to the first connector (60) and said one port (26, 28), respectively; wherein
        said first part (6) is a hard disk drive and the second part (5) is a backplane used in a computer; wherein
        all the intermediate part (20), the adaptor (10) and the second part (5) are in a parallel relation with one another.

* * * * *